United States Patent
Soelch et al.

(10) Patent No.: US 6,441,074 B1
(45) Date of Patent: Aug. 27, 2002

(54) HIGH ARC TRACKING-INDEX POLY (PHENYLENE OXIDE)-LIQUID CRYSTALLINE POLY

(75) Inventors: Richard Robert Soelch, Essex Junction, VT (US); Steve G Cottis, Hightstown, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/479,713

(22) Filed: Jan. 7, 2000

Related U.S. Application Data

(60) Provisional application No. 60/115,261, filed on Jan. 8, 1999.

(51) Int. Cl.⁷ .................................................. C08K 3/30
(52) U.S. Cl. ........................................................ 524/418
(58) Field of Search ......................................... 524/418

(56) References Cited

U.S. PATENT DOCUMENTS

| | | | |
|---|---|---|---|
| 3,228,910 A | | 1/1966 | Stamatoff |
| 3,455,736 A | | 7/1969 | Davis |
| 3,491,058 A | | 1/1970 | Taylor |
| 3,507,832 A | | 4/1970 | Davis |
| 4,043,971 A | | 8/1977 | Wurmb et al. |
| 4,269,947 A | | 5/1981 | Inata et al. |
| 4,283,114 A | | 8/1981 | Wandrack |
| 4,421,888 A | | 12/1983 | Okada |
| 4,585,823 A | | 4/1986 | Saito et al. |
| 4,636,544 A | | 1/1987 | Hepp |
| 4,824,723 A | | 4/1989 | Campbell et al. |
| 4,954,569 A | * | 9/1990 | Weymans .................... 525/146 |
| 5,006,403 A | | 4/1991 | Isayev |
| 5,110,896 A | | 5/1992 | Waggoner et al. |
| 5,182,334 A | | 1/1993 | Chen, Sr. et al. |
| 5,260,380 A | | 11/1993 | Isayev |
| 5,275,877 A | * | 1/1994 | Isayev ......................... 428/294 |
| 5,387,574 A | | 2/1995 | Campbell et al. |
| 5,476,695 A | * | 12/1995 | Okada ............................ 428/1 |
| 5,498,689 A | | 3/1996 | Furuta et al. |
| 6,017,984 A | | 1/2000 | Schonfeld et al. |

FOREIGN PATENT DOCUMENTS

| | | |
|---|---|---|
| EP | 0 493 811 A2 | 7/1992 |
| EP | 0 566 149 A2 | 10/1993 |
| EP | 438128 B1 | 5/1996 |
| JP | 04202461 A | 7/1992 |
| WO | WO 88/00605 A1 | 1/1988 |
| WO | WO 95/32243 A1 | 11/1995 |
| WO | WO 99/02607 A2 | 1/1999 |

OTHER PUBLICATIONS

W. Thiele, "Reactive Compounding—with your extruder," Plastics Formulating & Compounding, Nov./Dec., (1996), p. 14–19.

Derwent Publication XP–002134681, JP 09 111112, Nippon GE Plastics KK, Apr. 28, 1997.

* cited by examiner

*Primary Examiner*—Paul R. Michl

(57) ABSTRACT

Blends of theremotropic liquid crystalline polymers and unfunctionalized poly(phenylene oxides) and a non-conductive filler, in which the dispersed phase domain size preferably is relatively small and present in discrete particles. These blends have excellent comparative tracking index and can be used as molded articles in electronics or electrical applications.

4 Claims, 9 Drawing Sheets

HIGH ARC TRACKING-INDEX POLY (PHENYLENE OXIDE)-LIQUID CRYSTALLINE POLY

This application claims the benefit of U.S. Provisional Application No. 60/115,261, filed Jan. 8, 1999.

FIELD OF THE INVENTION

This invention relates to novel blends of poly(phenylene oxide), liquid crystalline polymers, and non-conductive fillers, and in particular, to such blends having improved combinations of high arc tracking-index, good toughness and good cosmetic appearance.

BACKGROUND OF THE INVENTION

Poly(phenylene oxide) (PPO) and liquid crystalline polymers (LCP) are individually useful as molding resins for general purpose uses, and more specifically in the electrical and electronics industries due to their thermal stability, chemical resistance, and other desirable properties. However, each has limitations for certain electrical applications.

Poly(phenylene oxide) exhibits good impact resistance, is relatively inexpensive and has a high glass transition temperature which gives it good high temperature stiffness properties. The PPO is very viscous and fails to process well in typical thermoplastic fabrication equipment. Previous innovations to improve the processibility relied upon blending the PPO with other polymers, usually containing polystyrene or copolymers with a styrene derived component. These innovations have been very successful at making widely useful PPO based materials (blends) that process very well (for example General Electric Plastic's Noryl® product line). However, the PPO blends with polystyrene and similar copolymers have reduced glass transition temperatures and the resulting high temperature stiffness is lower than that of pure PPO by about 40° C. or more. There are needs for a material with PPO's high temperature stiffness that processes well yet retains good toughness.

Liquid crystalline polymers typically process very well and have good high temperature stiffness and good electric properties but are relatively expensive. Blends of PPO with LCP, particularly in combination with fillers for improved arc tracking-index, are potentially advantageous. However, it is commonly known that LCP's are generally incompatible with PPO, with or without fillers added.

U.S. Pat. No. 5,182,334 discloses that LCP/PPO blends tend to have large regions or domains of the individual polymers rather than fine, well-dispersed domains; large domains tend to produce poor properties. The LCP/PPO blends are said to be compatibilized by reacting the acid or ester functionality on the LCP with a hydroxyl on PPO in an acid catalyzed process.

U.S. Pat. No. 5,006,403 discloses a polymer composite of about 5–97.5 wt. % PPO and about 95–2.5 wt. % LCP, with the two components being present as separate phases in blends. The product blend was a self-reinforced polymer composite, in which the PPO is the matrix, and the wholly aromatic polyester is in the form of predominantly uni-directionally oriented continuous fibers or strands, oriented in the direction of extrusion. The self-reinforced composites are deemed to be particularly suitable for automotive and aerospace applications as replacements for composite components produced by sheet molding compound technology. The increase in tensile strength demonstrated by these fiber self-reinforced composites is offset by the poor elongation properties (a measure of toughness) inherent with this type of morphology (due to the presence of relatively large continuous fibers or strands in the composites).

PPO/LCP blends should exhibit good tracking properties for many electrical and electronic applications. Arc-tracking is a phenomenon associated with the formation of permanent and progressive conducting paths on the surface of materials by the combined effects of an electrical field and external surface pollution. Electrical tracking can occur when a damaged energized electrical part becomes wet, e.g., from electrolytes or condensation. This tracking may lead to flash over and arcing that causes further damage in the electrical part, causing a catastrophic cascade failure. Tracking can occur at low voltages, e.g., 100V AC or less but becomes less likely as the voltage is reduced. The comparative tracking index (CTI) rating provides a quantitative indication of a composition's ability to perform as an electrical insulating material under wet and/or contaminated conditions. In determining the CTI rating of a resin composition, two electrodes are placed on a molded test specimen. A voltage differential is then established between the electrodes while an aqueous ammonium chloride solution is slowly dripped on the test specimen. The CTI rating of the test specimen is the maximum electrode voltage differential at which, in five consecutive tests, more than 50 drops of the solution must be applied to the test specimen in order to cause tracking to occur. Hence, the CTI value is the voltage at which a molding is found to exhibit conductivity. For some applications in the electrical and electronics industry, the CTI value is expected to be at least 220 volts.

U.S. Pat. No. 4,043,971 discloses a thermoplastic polybutylene terephthalate molding composition containing about 5 to 60 wt. % calcium sulfate and/or barium sulfate to increase its tracking resistance. However, this patent does not disclose or suggest using calcium sulfate in LCP/PPO blends.

A need continues to exist for practical and less expensive compositions and methods for making PPO/LCP blend compositions having improved properties. In particular, a need exists for practical PPO/LCP blend compositions displaying good tracking index properties as well as other desirable characteristics of PPO/LCP blends, and comprising less expensive constituents and fillers.

SUMMARY OF THE INVENTION

Our invention includes polymer blends comprising (a) about 50 to 95 weight percent, based on the total weight of components (a) and (b), of poly(phenylene oxide); (b) about 5 to 50 weight percent, based on total weight of components (a) and (b), of thermotropic liquid crystalline polymer; and (c) non-conductive filler, in an amount sufficient to increase the comparative tracking index (CTI) rating of the polymer blend to above 220 volts.

Also included are molded articles comprising polymer blends of our invention, including applications in electronic and electrical apparatus.

Other aspects and embodiments of our invention will be better understood in view of the following detailed description of preferred embodiments and the accompanying figures.

BRIEF DESCRIPTION OF THE FIGURES

FIGS. 2 and 3 are micrographs of the core of the tensile bar at the far end or end of tensile bar farthest from the injection gate.

FIGS. 4 and 5 show the tensile bar morphology in the near core or the core near the injection gate.

FIGS. 6–9 show the area of the molded bar at the very outer edge or skin layer.

DETAILED DESCRIPTION OF PREFERRED EMBODIMENTS

Figure 1:
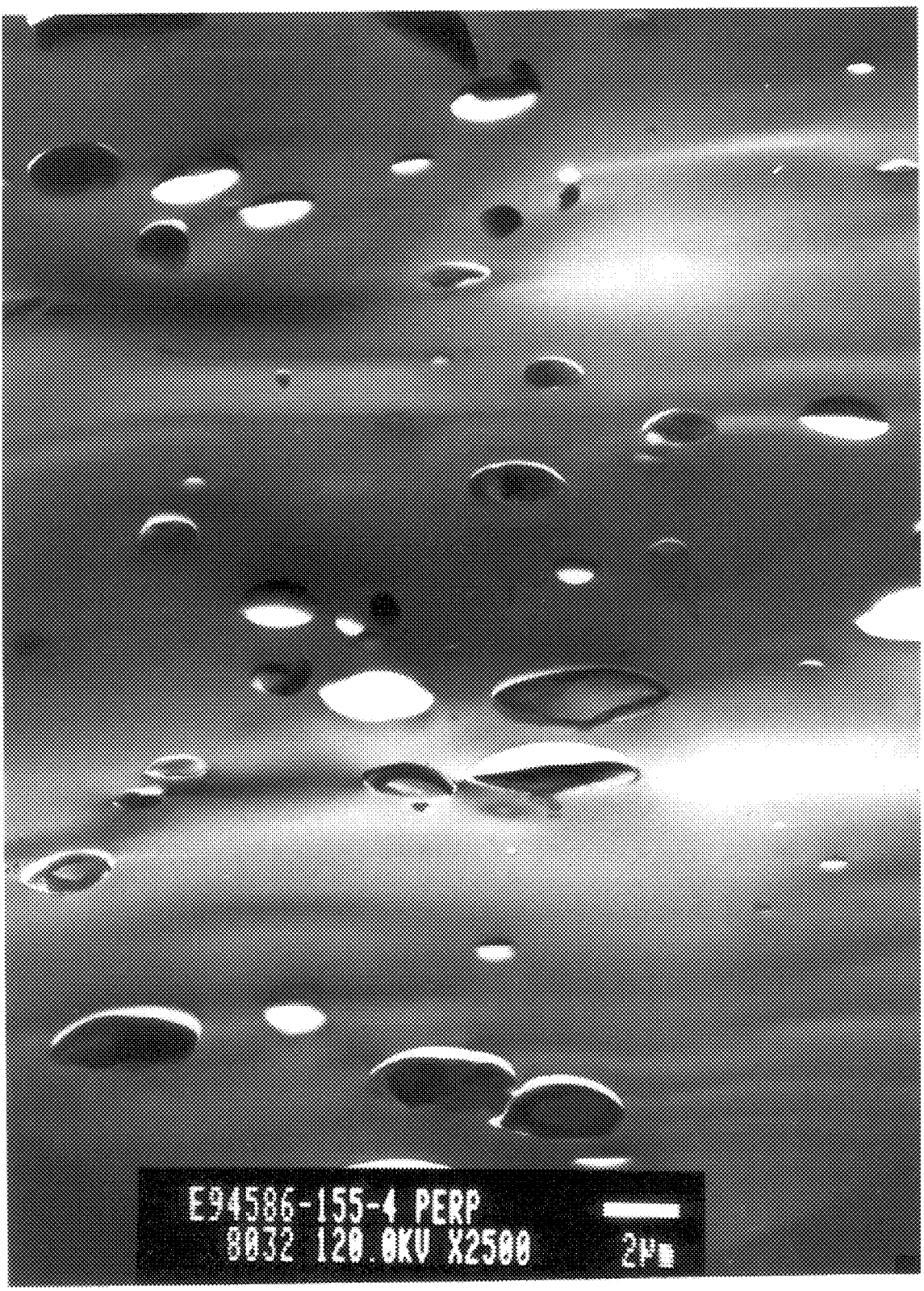
FIG. 1 is a picture magnified 2500 times of a fine LCP dispersion within a PPO/LCP blend product pellet cut from the center of an extruded cylindrical strand before molding into a test bar. There are particles present from around 0.1–5 microns in length.
Figure 2:
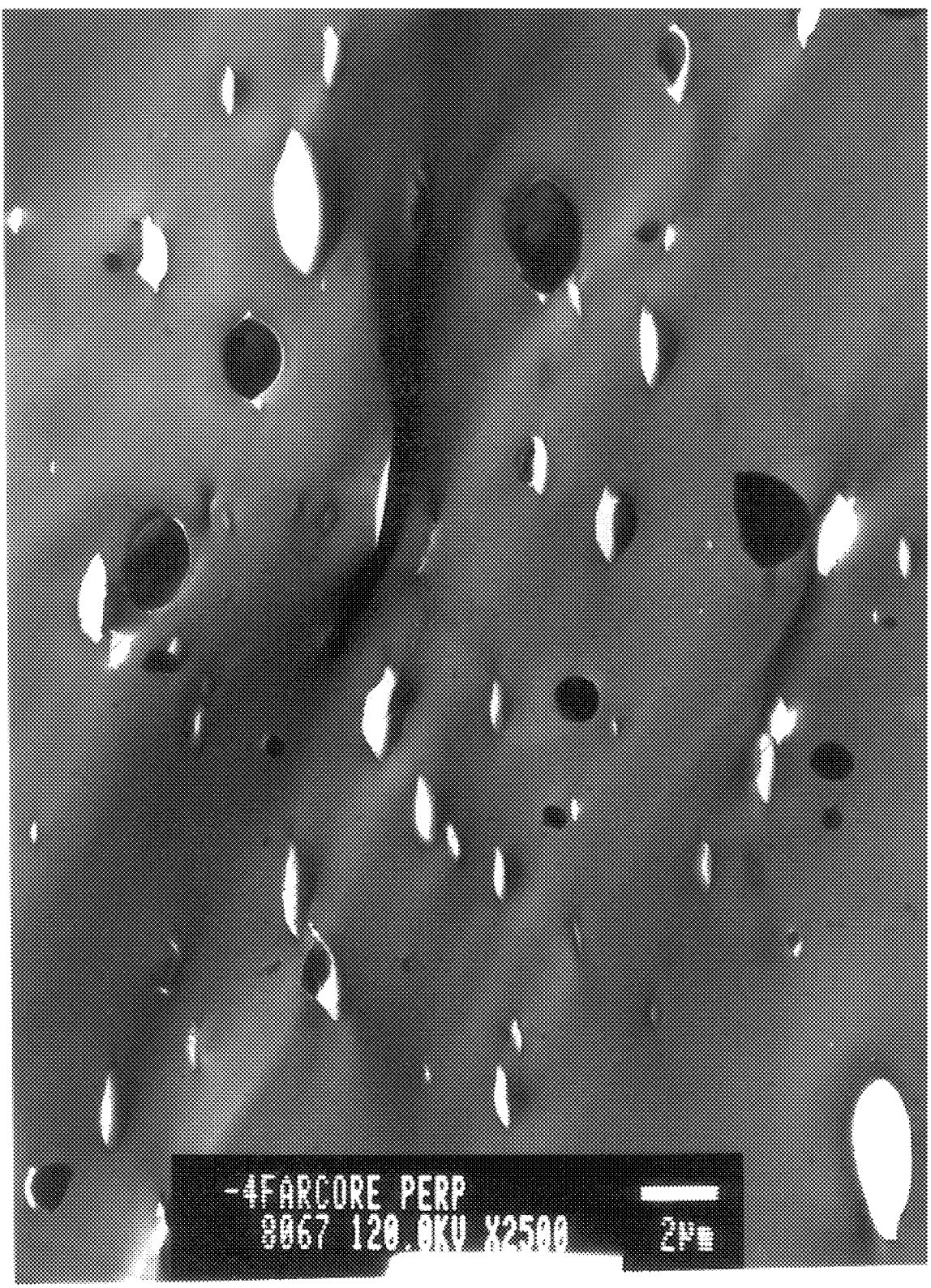
FIGS. 2–9 show various micrographs obtained from a tensile test bar molded from the pellets of FIG. 1. The bulk of the material is represented by similar morphology as in FIG. 1.
Figure 3:
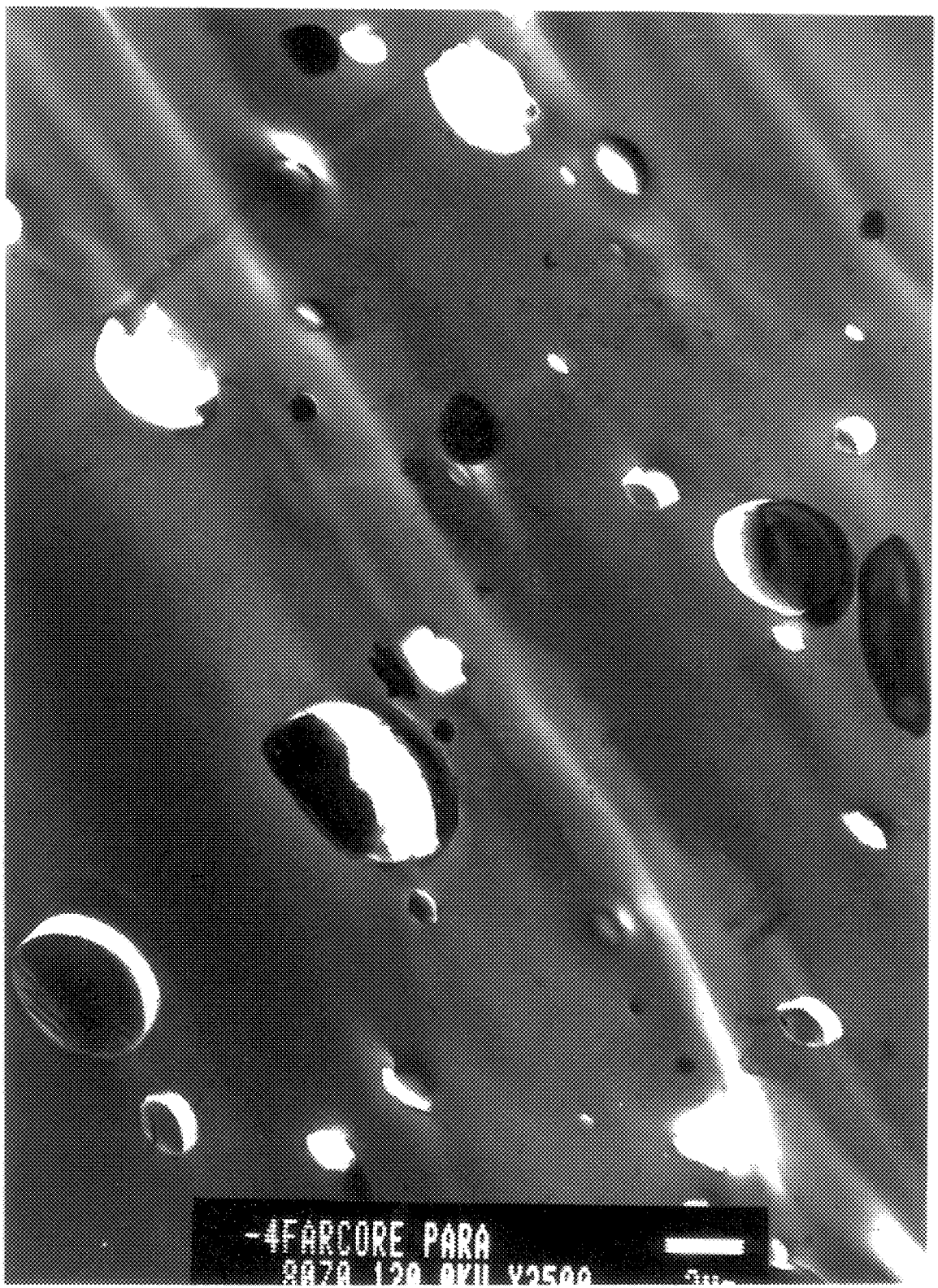
Figure 4:
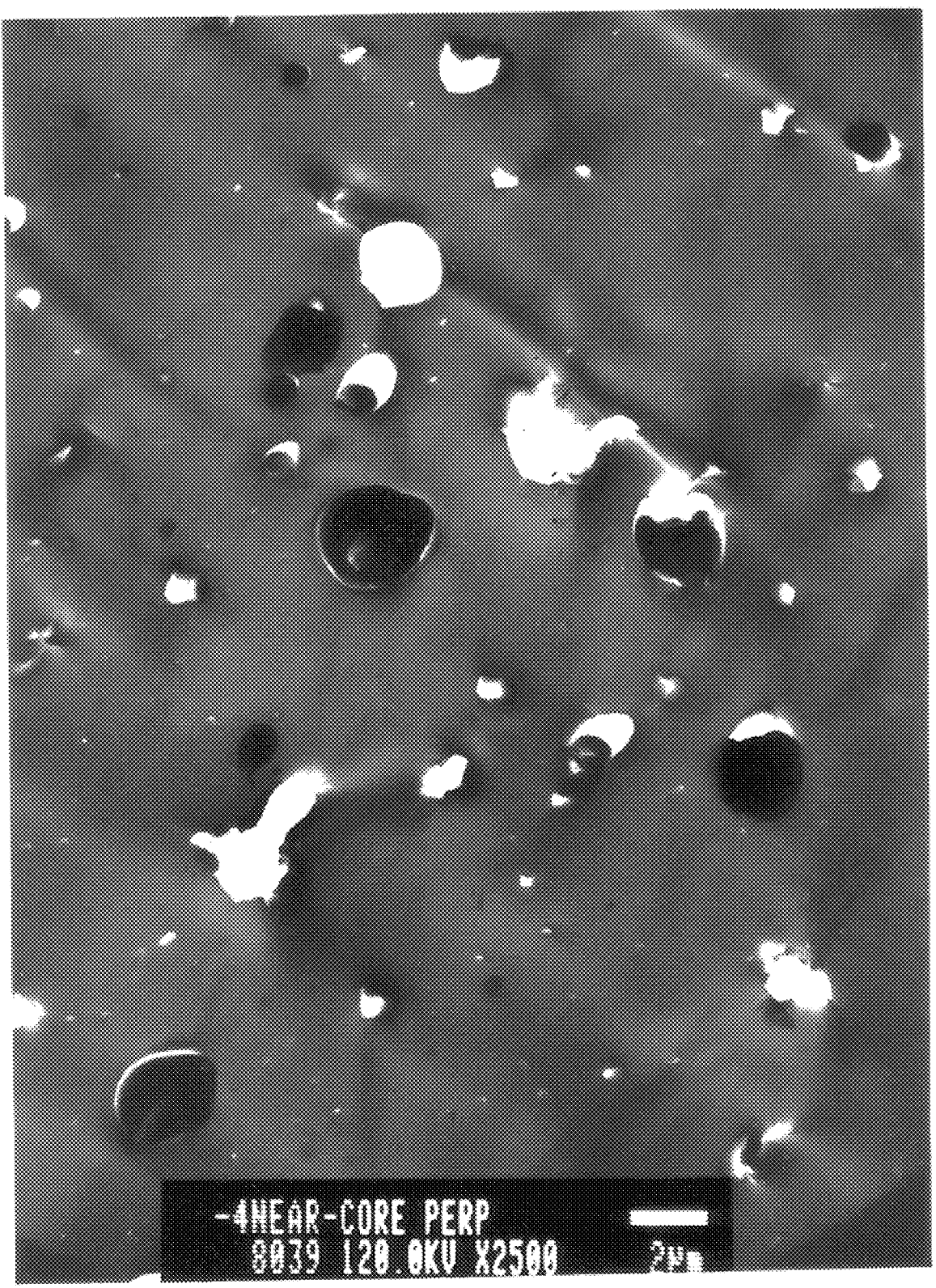
Figure 5:
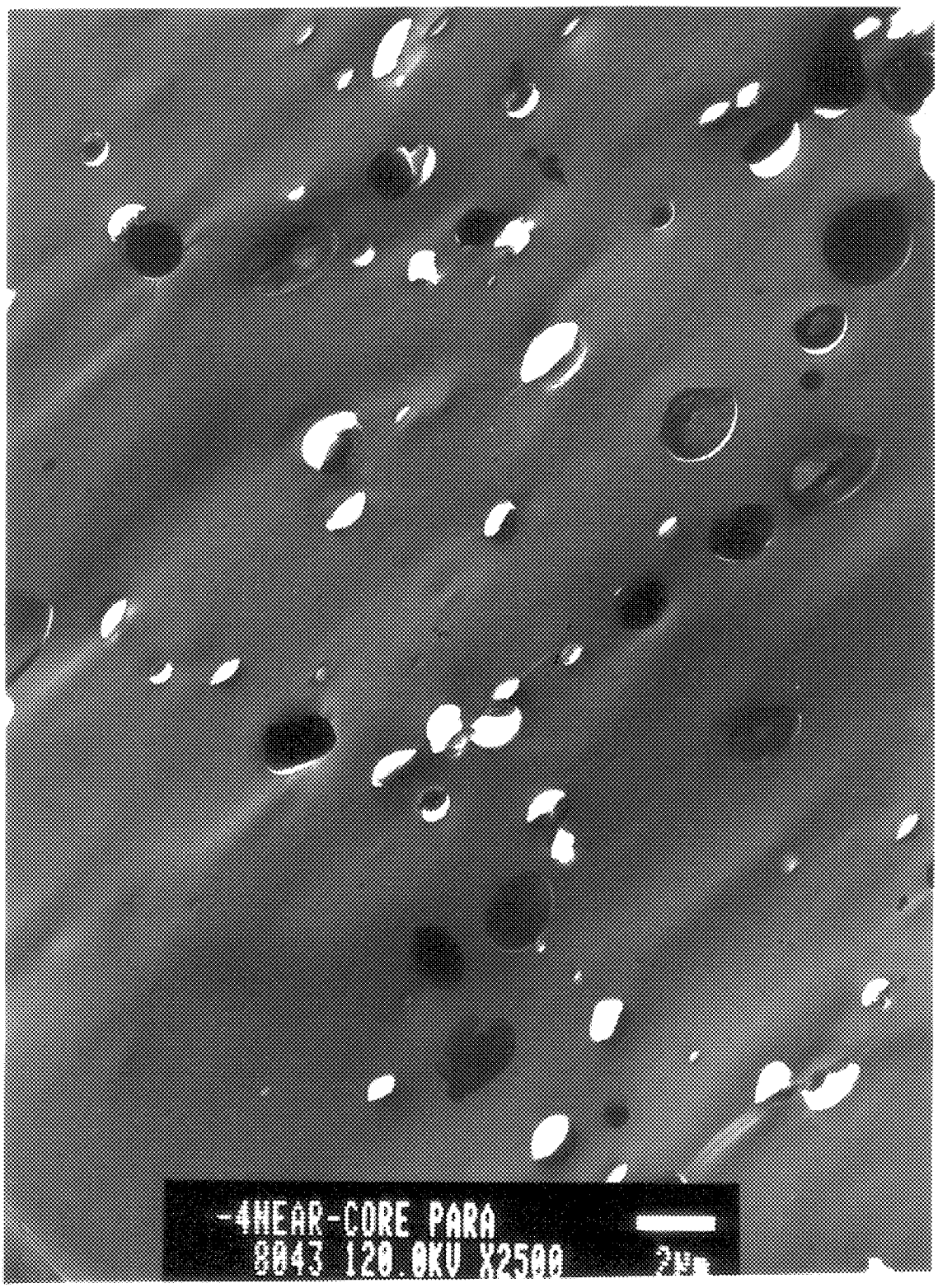
Figure 6:
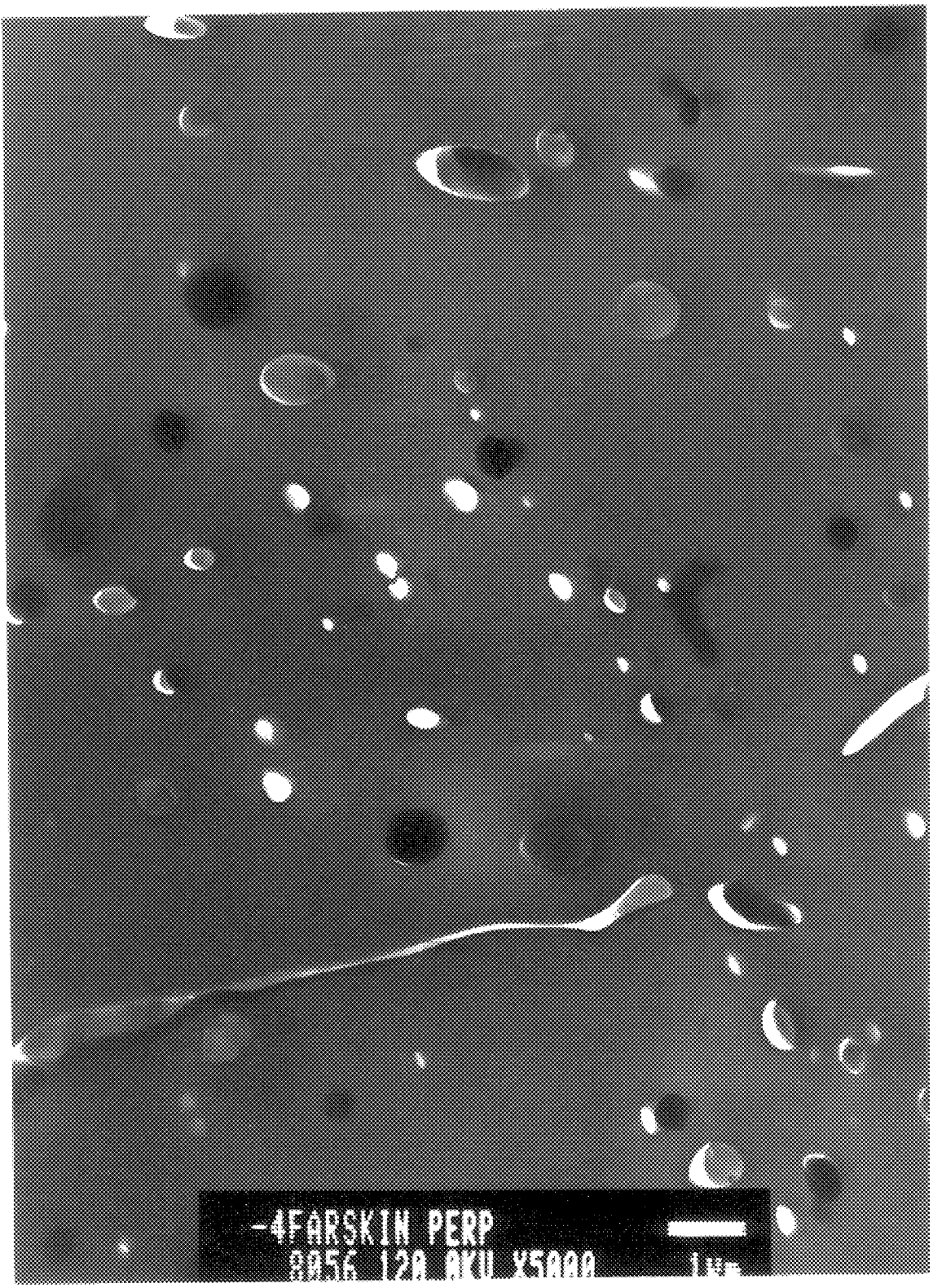
Figure 7:
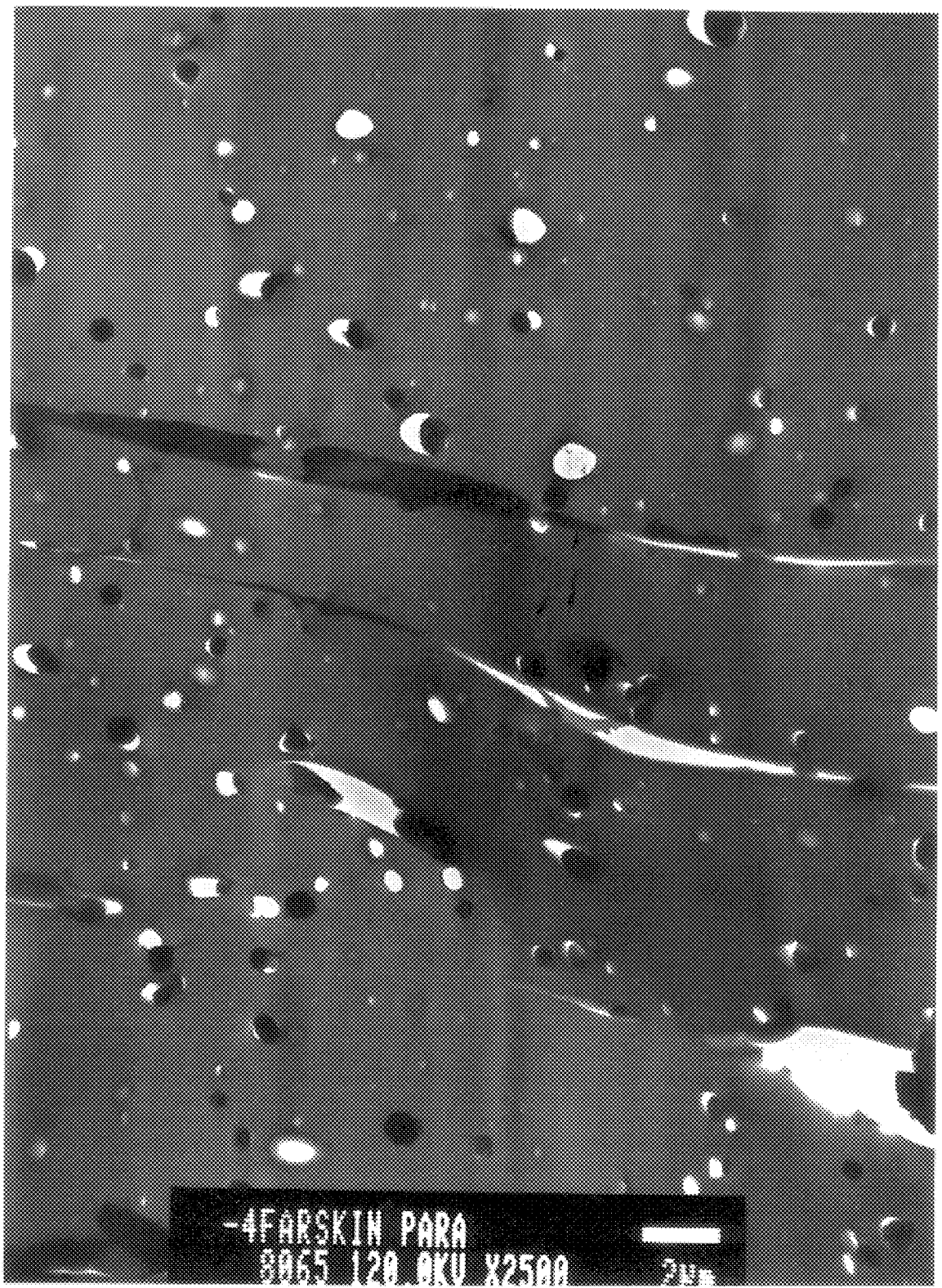
Figure 8:
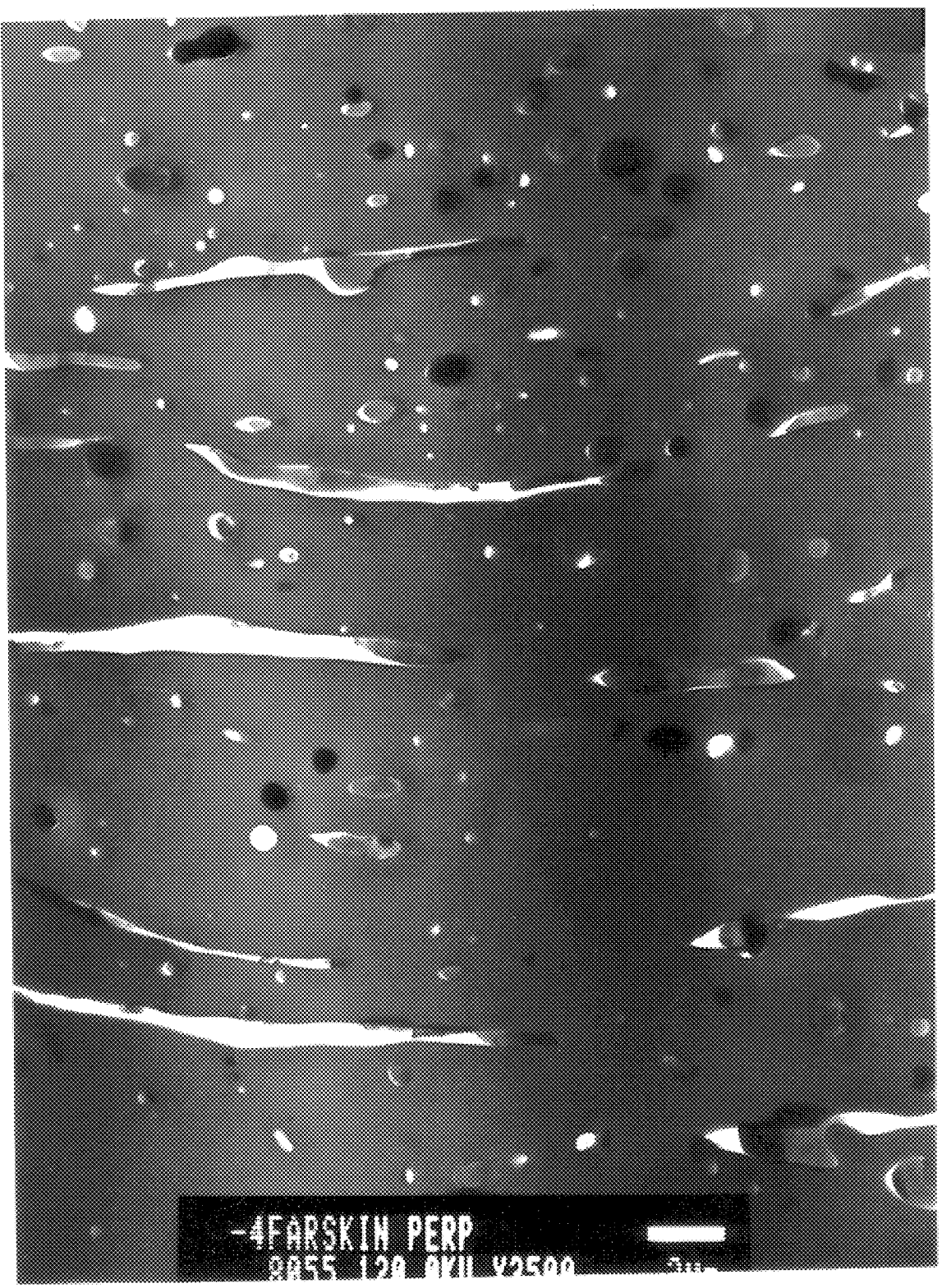

We have found that improved tracking index can be achieved with other desirable characteristics of PPO and LCP in a polymer blend composition comprising a PPO component, an LCP component, and a non-conductive filler component. Our polymer blends may also contain brightness enhancing agents and other conventional additives. Preferred processes, morphologies, and applications of our polymer blends are also set forth below.

PPO Component

PPOs or polyphenylene oxides (also known as polyphenylene ethers) used in the present invention are a well-known class of polymers. PPOs are produced from the oxidative coupling polymerization of 2,6-dimethylphenol. Preparation of the polyphenylene oxides is carried out by a process analogous to known processes starting from the corresponding phenols. Methods of preparation suitable for this purpose are described, for example, in U.S. Pat. Nos. 3,228,910, 3,491,058, 3,507,832 and 3,455,736, each of which are hereby incorporated by reference.

PPOs are linear amorphous polymers with a glass transition temperature of about 210° C. PPOs are widely used in industry, especially as engineering plastics in applications requiring toughness and heat resistance. In a preferred embodiment, the PPOs are unfunctionalized PPOs, being polymers with the repeat unit

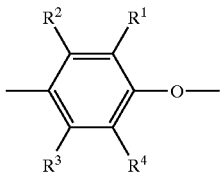

each of $R^1$, $R^2$, $R^3$ and $R^4$ are hydrogen or hydrocarbyl containing to 6 carbon atoms. In the most preferred embodiment, $R^1$ and $R^4$ are methyl and $R^2$ and $R^3$ are hydrogen. The unfunctionalized PPO does not have any added functional groups present (i.e., is unfunctionalized), but "normally present" end groups may be present. Lower viscosity PPOs for easier mixing are preferred. Low molecular weight PPOs are also preferred.

The amount of PPO in the blends of the present invention is preferably 50 to 95 weight percent, based on total weight of the PPO and LCP polymers present in the blend. The amount of PPO is preferably 30 to 90 weight percent, more preferably 35 to 70 weight percent, and even more preferably 40 to 65 weight percent, based on the total weight of the polymer blend composition.

LCP Component

Thermotropic liquid crystalline polymers (LCP) are known in the art by various terms, including "liquid crystal" and "anisotropic melts." A polymer is optically anisotropic if, in the melt phase, it transmits light when examined between crossed polarizers using a polarizing microscope. By "thermotropic" is meant that the polymer exhibits liquid crystalline properties in the molten phase.

The LCP polymers useful herein include thermotropic liquid crystalline polyesters and liquid crystalline poly(ester-amides), poly(ester-imide), poly(ester-amide-imide), or mixtures thereof. These terms have their usual meaning, and simply indicate that the repeat units in the polymer are joined by ester and optionally amide and/or imide linkages. Preferred polymers are liquid crystalline polyesters, and it is further preferred that these polyesters be aromatic polyesters. By "aromatic" is meant that, except for the carbon atoms contained in functional groups such as ester, amide or imide, all of the carbon atoms in the main chain of the polymer are present in aromatic rings such as phenylene, naphthylylene, biphenylene, etc. Carbon atoms in other types of groupings such as alkyl may be present as substituents on the aromatic rings, as in a repeat unit derived from methylhydroquinone or 2-t-butyl-4-hydroxybenzoic acid, and/or also present at other places in the polymer such as in n-alkyl amides. Other substituent groups such as halogen, ether, and aryl may also be present in the LCP.

As the components of the wholly aromatic polyester used in the LCP compositions of the present invention, there may be used for example: i) hydroquinone; ii) 4,4'-dihydroxybiphenyl(4, 4'-biphenol); iii) isopthalic acid; iv) terephthalic acid; v) p-hydroxybenzoic acid or its derivatives; vi) 4,4'-dihydroxybiphenyl (4,4'-bibenzoic acid) or its derivatives; viii) 2,6-naphthalenedicarboxylic acid; iv) 6-hydroxy-2-naphthoic acid, or combinations thereof. These components are all known in the art and are commercially available or can be prepared by techniques readily available to those in the art.

The amount of LCP in the blends of the present invention is preferably 5 to 50 weight percent, based on the total weight of the PPO and LCP polymers present in the blend. The amount of LCP is preferably 2 to 50 weight percent, more preferably 4 to 10 weight percent, and even more preferably 5 to 8 weight percent, based on the total weight of the polymer blend composition.

The PPO component and the LCP component combined comprise preferably 20 to 80 weight percent, more preferably 35–75 weight percent, and even more preferably 50–70 weight percent, based on the total weight of the polymer blend composition of our invention.

Filler Component

The amount of non-conductive filler present in the polymer blends of the present invention is an amount sufficient to achieve a CTI rating of preferably at least 220 volts, more preferably at least 250 volts, even more preferably at least 275 or 300 volts, and most preferably at least 325 or 350 volts.

Preferred non-conductive fillers include titanium dioxide, calcium sulfate, or mixtures thereof. A preferred titanium dioxide comprises a chloride process rutile type titanium dioxide.

Typically, the level of the non-conductive filler may range preferably from 20 to 80 weight percent, more preferably from 25 to 65 weight percent, and most preferably from 30 to 50 weight percent, based on the total weight of the polymer blend composition of our invention.

A preferred non-conductive filler combination for use in the LCP compositions of the present invention is a mixture of titanium dioxide and calcium sulfate in an amount of about 30 to 40 wt. % of the total weight of the polymer blend composition, with the titanium dioxide being present in an amount of about 5 to 10 wt. % of the total weight of the polymer blend composition.

Preferably, the calcium sulfate has a mean particle size of about 4 microns and the titanium dioxide has a particle size of about 0.2 to 0.4 microns.

Optional Brightness Enhancing Agent

We have found that when a brightening agent was added to the PPO-LCP blends, there was noticeable improvement in the tracking properties. The boiling point of the brightening agent should be as follows: $T_{bp} > T_m - 60° C.$, where $T_{bp}$ is the boiling point of the brightening agent and $T_m$ is the melting point of the LCP.

Brightness enhancing agents are also commonly known as fluorescent optical brighteners. They include, but are not particularly limited to, 2,2'-(thiophenediyl)-bis-(t-butyl benzoxazole); 2-(stibyl-4")-(naphtho-1',2',4,5)-1,2,3-triazole-2"-sulfonic acid phenyl ester; and 7-(4'-chloro-6"-diethylamino-1',3',5'-triazine-4'-yl)amino-3-phenyl coumarin. Other fluorescent optical brighteners which have one or more moieties derived from substituted anchracene, stilbene, triazine, thiazole, benzoxazole, coumarin, xanthene, triazole, oxazole, thiophene or pyrazoline may be utilized in the LCP compositions of the present invention.

Examples of suitable optical brighteners which can be used in accordance with this invention are Uvitex® OB (from the Ciba-Geigy Chemical Company, Ardaley, N.Y.), which is thought to be 2,5-Bis(5-tert-butyl-2-benzoxazoly) thiopene having bis(alkyl-substituted benzoxazolyl) thiophene structure; Leucopure® EGM (from Sandoz, East Hanover, N.J.), which is thought to be 7-(2h-naphthol(1,2-d)-triazol-2yl)-3phenyl-coumarin; Phorwhite® K-20G2 (from Mobay Chemical Corporation, Union, N.J.), which is thought to be a pyrazoline derivative; and Eastobrite® OB-1 (from Eastman Chemical Products, Inc. Kingsport, Tenn.), which is thought to be 4,4-Bis(benzoxaczoly)stilbene. The above-mentioned Uvitex® OB is most preferred for use in accordance with this invention.

A concentration of greater than about 0.005 weight percent, and preferably from about 0.005 to about 0.3 weight percent, based on the total weight percent of the polymer blend, of a high-boiling brightness enhancing agent, or fluorescent brightener, is preferred. We have found that such extraordinarily small amount of fluorescent brightener when used in combination with the non-conductive filler, not only substantially enhances the appearance of the material, but also further improves the CTI rating of the blends.

Other Additives:

Additives that are normally added to polymers may also be added to the LCP/PPO/non-conductive filler blends described herein. Such additives include reinforcing agents, pigments, dyes, antioxidants, lubricants, flame retardants, and colorants such as anthraquinone, direct dyes, para red, and the like. Preferred fillers and/or reinforcing agents include talc, glass flake, glass fiber, aramid fiber, and the like.

Compatibilizers for the blends may also be added, and a preferred compatibilizer is a functionalized ethylene copolymer E/X/Y containing: 45–99 weight percent E ethylene; 0–40 weight percent X which is one or more softening monomers chosen from C1–C10 esters of acrylic or methacrylic acid; and 1–15 weight percent Y which is a co-monomer chosen from the group consisting of glycidyl acrylate, glycidyl methacrylate and glycidyl vinyl ether.

Preferred Preparation of High CTI LCP/PPO/Non-Conductive Filler Blends

A preferred preparation method involves consideration of two important factors in achieving preferred blends, namely: 1) relatively high shear mixing (sometimes also called intensive dispersive mixing) of the components; and 2) the viscosity matching of the LCP and PPO components of the blends. See, for example, PCT WO 99/02607, which is hereby incorporated by reference.

High shear mixing is known in the art, see for instance W. Thiele, Plastics Formulating & Compounding, vol. 2 (1996), p. 14–19. Although not necessary, such mixing may be conveniently carried out in a twin-screw extruder equipped with the proper combination of mixing elements. Such elements and their combination are known in the art (see for instance Thiele), and are also described herein in the Examples.

By viscosity matching or "viscosity matched" is meant that at least for some part of the process where melt mixing and dispersion of the polymers may take place, the LCP and PPO have approximately the same effective (melt) viscosity. This can be achieved for instance by using one or more of the following methods:

a) Adjusting the molecular weights (MW) and/or the molecular weight distributions (MWD) of the LCP and/or PPO: The MW and/or MWD are adjusted so that they exhibit comparable melt viscosities in some part of the mixing process. This often may mean raising the LCP molecular weight and/or lowering the PPO molecular weight, since the more common grades of LCP tend to have lower viscosity than the common grades of PPO.

b) Selecting the proper LCP melting point: Another approach is to choose an LCP with a melting point between about 300–350° C. This corresponds to the temperature range where PPO becomes substantially melt processable. Substantially melt processable means the PPO viscosity is less than about 400 Pa*s at 1000 1/s. The LCPs with melt points between about 300° C.–350° C. may form higher performance blends with PPO more easily than lower melting LCPs. It is hypothesized that the PPO may soften first, before the LCP melts. As the LCP begins to melt the chance for phase inversion occurs which should tend to maximize interfacial area. It is hypothesized to be advantageous to operate the melt compounding process such that this maxima in interfacial area occurs (which should also coincide with transient viscosity matching) whilst subjecting the blend to a relatively high level of dispersive mixing.

c) Adjust mixing speed to coincide with high-shear dispersive mixing: For LCPs melting below about 300° C. the compounding process may be run so that the solid state mixture of the feed ingredients is subjected to relatively high shear dispersive mixing before the LCP melted. In this way, the LCP melting transition coincides more closely with high shear dispersive mixing with the PPO. Another approach that is useful is to add the low melting but unmelted LCP to a preheated PPO or substantially molten PPO in a way that the mixture rapidly encounters relatively high shear dispersive mixing before the LCP melts.

Preferred Morphology of Blends

Preferably, the LCP is present in our blends as discontinuous phases or discrete particles.

FIGS. 1–9 show electron micrographs of a PPO-LCP blend without the non-conductive filler present to give a clearer picture of the nature of such a preferred polymer blend matrix In the Figures, the PPO is the dark background material with the LCP particles appearing as even darker spots embedded in the PPO. The white spots are holes where LCP has fallen out of the matrix during microtoming (those skilled in the art recognize this phenomena is not unusual). The white spots can reasonably be assumed to be representative of the size of the LCP that was present before microtoming. Indeed, in some of the pictures the LCP has popped out of the hole but is still visible in the picture nearby. The micrographs were taken at 2500× magnification except for FIG. 6 which was obtained at 5000× magnification. A scaling bar is also included indicating the length corresponding to 2 microns in all pictures except FIG. 6 where the bar scales to 1 micron. The PERP designation indicates the sample was sliced perpendicular to the flow direction whilst the PARA designates the cut was made parallel to the melt flow.

Figure 9:
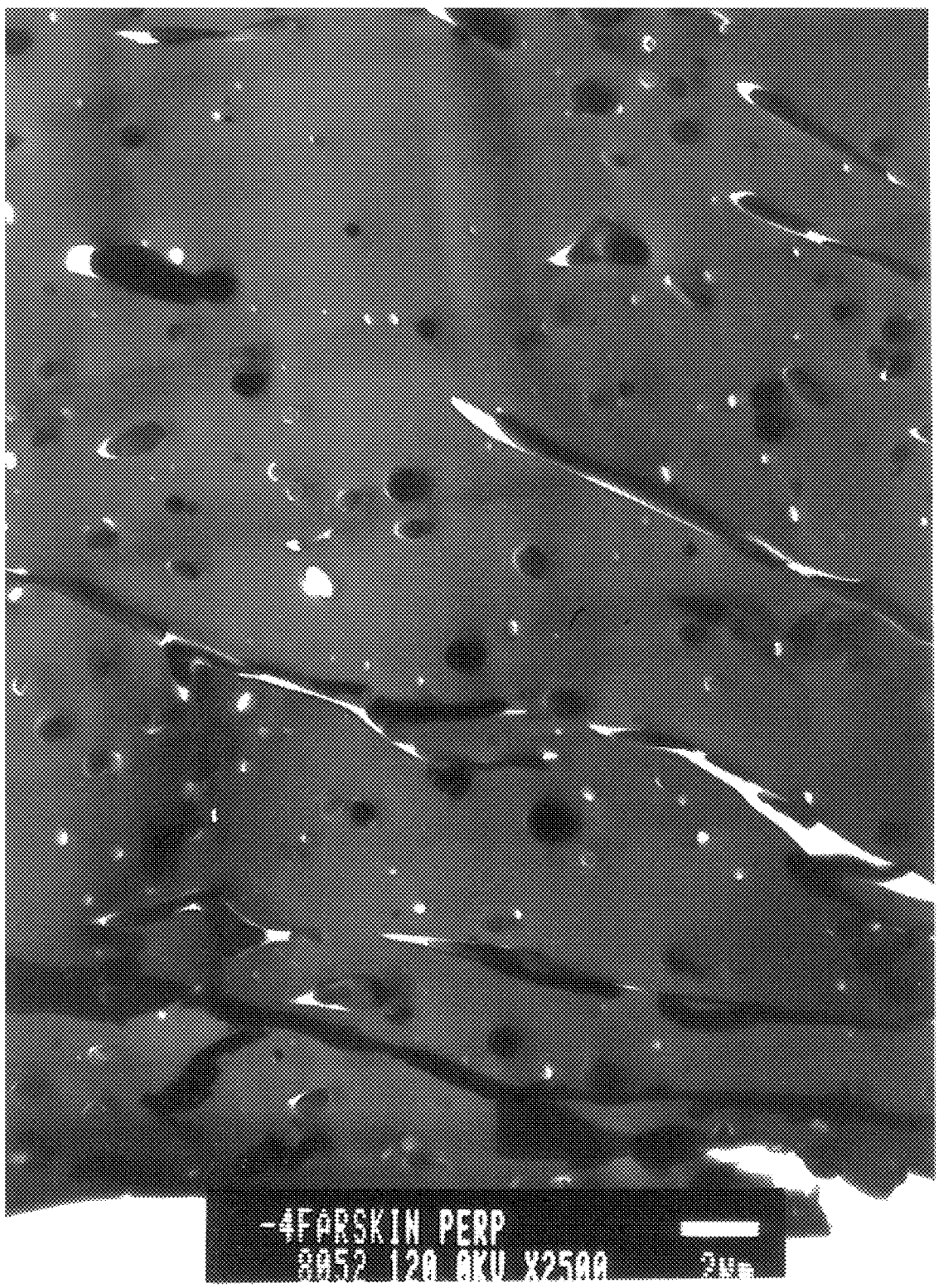

The finely dispersed LCP phase has similar particle size and shape in the pellet (FIG. 1) and throughout the bulk of the tensile bar molded therefrom (FIGS. 2–9; in FIG. 9, the actual original bar surface is visible at the bottom of the micrograph). Thus, the finely dispersed LCP phase is stable within the injection molding time scale.

Examination of the morphology of tensile bar samples of preferred embodiments of our invention shows the formation of discrete particles or droplets that are mostly spherical or ellipsoidal in nature with major diameter of about 0.1–5 microns in both the parallel or transverse directions, as shown in FIGS. 1–5. The LCP domains appear to be the same in either the parallel or transverse directions in the bulk core of the test samples. On the skin surface of test specimens or in very thin samples, the LCP component is observed to be spherical or ellipsoidal particles or droplets as well as in the form of discrete particles with higher aspect ratios (non-limiting examples of which are shown in FIGS. 6–9). The exact morphology in the surface will depend upon the test part geometry, and we employed the following particle size analysis method in obtaining FIGS. 1–9.

Particle Size Analysis Method

Compositions were injection molded according to the procedure given below into ASTM D 638 Type 1 Tensile bars with 3.18 mm (0.125 in.) thickness and overall length of 21.9 cm (8.625 in.). The injection gate is on the edge of the bar at about 3.2 cm (1.25 in.) along the major axis from one end of the tensile bar hereafter identified as the near end. The gate dimensions were approximately 6.4 mm (0.25 in.) in length by about 2.54 mm (0.100 in.) thick with the gate being flush with the bar surface opposite the knock out pins. The tensile bar was cut or sectioned about 2.5 cm (1 in.) from the far end (the other end without the injection gate) across the bar or transverse to the flow direction (i.e. perpendicular to the major axis of the bar). This cut is made in the wider portion of the tensile bar [1.9 cm. (0.75 inch) wide]. The sectioning was performed cryogenically at −90° C. using a Reichert-Jung Ultracut microtome equipped with a diamond-edge knife. Section thickness was about 8–10 μm. Particle size analysis was conducted on: a) core sections obtained about at least 0.64 mm (0.025 in.) from the original surface of the bar; and b) surface skin sections obtained about 10–20 microns from the surface.

The sections obtained were affixed between glass slides and coverslips using Canada balsam and photographed using phase contrast bright field and polarized light illumination on a Leitz® optical microscope. Magnifications of either 50× or 100× were then used for image analysis of preferred compositions of the invention.

Transmission Electron Microscopy (T.E.M.) was used to generate images for the compositions. Particle size was determined using a Cambridge Instruments Quantimet® 970 image analysis system. The photographed images generated by optical microscopy or T.E.M. are then digitized using a high resolution video camera. The field size used was typically 800×625 pixels. The system was normally calibrated using an image of the calibration scale or by the scale marker located directly on the optical micrographs. This image is then segmented to form a binary (on-off) image of the features of interest. The image is subsequently analyzed using a program which yields the various dimensional parameters of interest. This program is readily understood by an artisan skilled in image analysis. A good source of information about image analysis can be found in the book: "Practical Stereology" by John C. Russ, Plenum Press, NY, 1986.

Preferred Applications

Compositions of our invention may be used alone as molding pellets or mixed with other polymers. The pellets may be used to produce fibers, films, and coatings as well as injection molded or extruded articles, particularly for electrical or electronic applications requiring high tracking resistance properties, such as solderable electronic components and circuit breakers.

EXAMPLES

The following examples illustrate preferred embodiments of our invention. Our invention is not limited to these examples.

Materials Used:

In the Examples certain materials are used. They are summarized below:

PPO: The PPOs used were obtained from General Electric Co., Stamford, Conn., U.S.A. Noryl®640 also referred to as PPO640 in this application is a 0.4 I.V. poly(phenylene oxide) and was used for all the examples except as otherwise noted. Noryl®630 also referred to as PPO630 was used in one example in Table 2 and also in the Figures. The composition in the Figures is 90% PPO630 and 10% LCP, with no fillers present.

LCP: The LCP polymer comprises hydroquinone/terepthalic acid/isopthalic acid/2,6-napthalenedicarboxylic acid/4-hydroxybenzoic acid in molar ratio 100/33/33/34/320.

One of the non-conductive fillers used is a chloride process rutile type titanium dioxide available from SMC Corp. of Baltimore, Md. as Tiona® RCL-4, with 97% $TiO_2$ and with surface treated with alumina and an organic substance.

Another non-conductive filler used is an anhydrous calcium sulfate available from U.S. Gypsum Co., Chicago, Ill., U.S.A., as CAS-20-4, having an average particle size of 4.0 microns and a maximum size of 20 microns.

The brightening agent is from Ciba-Geigy Chemical Company, Ardaley, N.Y. as Uvitex® OB, which is a fine, yellow crystalline powder with a melting point of about 196–230° C. The material vaporizes starting at about 300° C.

Blend And Test Part Preparation

Unless otherwise specified, compounding of LCP compositions in the Examples below with PPO and the non-conductive filler and optionally in some examples, the brightening agent, was done using a 30 mm Werner & Pfleiderer Model 10YHD (Werner & Pfleiderer, 663 E. Crescent, Ramsey, N.J. 07446 U.S.A.) twin screw extruder with LCP's dried at about 150° C.–165° C. in a nitrogen purged vacuum oven for about 12 h (or overnight). The extruder was operated at 250–300 rpm with feed rates of about 11.3 kg (25 lb)/hr. The extruder has 9 barrel sections. The first barrel is the main feed barrel where the polymers are added and is typically water cooled. Temperature profiles for the remaining 8 barrels are 290° C., 290° C., 320° C., 320° C., 310, 310° C., 310° C., 310° C. and 335° C. for the die. A 3.2 mm (⅛") or 4.8 mm (³⁄₁₆") dia. one hole die was used. A single screw side feeder was used to add the non-conductive fillers to barrel 5 and a vacuum was pulled on barrel 7. The extruded strands were quenched in a water trough cooling bath, cut into pellets, dried at 120° C. overnight and subsequently injection molded into test bars.

In examples utilizing the brightening agent, the agent was first mixed with about ⅛ to ⅓ of the required non-conductive filler and this concentrate was then diluted with the remaining filler to ensure even distribution of the brightening agent. This filler/brightening agent mixture was then added through the sidefeeder to the extruder.

As previously discussed, it is preferred that the components be thoroughly blended at relatively high shear mixing and the ingredients be sufficiently viscosity-matched for maximum dispersion. Thus, the following extrusion screw design as shown in Table I is typical of the type used.

TABLE 1

| Element No. | Bushing Type | Comments | Number of Bushings | Cumulative Length (mm) |
|---|---|---|---|---|
| 1 | PD | | 1 | 10 |
| 2 | 42/42 R | SK_Feed | 2 | 94 |
| 3 | 42/21 R | SK_Ramp | 1 | 115 |
| 4 | 28/28 R | | 3 | 199 |
| 5 | KB 28 R | | 1 | 227 |
| 6 | KB 42 N | | 1 | 269 |
| 7 | KB 14 N | | 1 | 283 |
| 8 | 20/10 L | | 1 | 293 |
| 9 | 42/42 R | | 2 | 377 |
| 10 | 28/28 R | | 1 | 405 |
| 11 | 20/10 L | | 1 | 415 |
| 12 | 42/42 R | | 2 | 499 |
| 13 | KB 20 R | | 2 | 539 |
| 14 | KB 28 N | | 1 | 567 |

TABLE 1-continued

| Element No. | Bushing Type | Comments | Number of Bushings | Cumulative Length (mm) |
|---|---|---|---|---|
| 15 | 20/10 L | | 1 | 577 |
| 16 | 42/42 R | SK_FEED (vacuum port) | 3 | 703 |
| 17 | 42/42 R | | 1 | 745 |
| 18 | 20/10 L | | 1 | 755 |
| 19 | 28/28 R | | 2 | 811 |
| 20 | KB 14 N | | 1 | 825 |
| 21 | 20/20 R | | 1 | 845 |
| 22 | 14/14 R | | 3 | 877 |

Tests:

Melt viscosities of dried samples were determined using a GalaxyO V, Model 8052 capillary rheometer made by Kayeness, Inc. The measurements were made at 350° C. 600° C. at a shear rate of 1000 1/sec and with a die having an orifice of 30/1000 inch and a L/D of 20.

The following physical tests described herein were carried out according to procedures established by the American Society for Testing and Materials (ASTM), including:

Flexural Modulus and Flexural Strength—ASTM D-790.

Tensile strength and elongation was measured on 3.2 mm (⅛") thick tensile bars with a crosshead speed of 0.51 cm (0.2")/min according to ASTM D638-91. Strain gauges were used to accurately determine elongation.

DTUL (Heat Deflection Temperature)—ASTM D-648.

Comparative Tracking Index (CTI) test was in accordance to ASTM UL 746A to determine a specimen's ability to perform as an insulating material under wet and contaminated conditions, as volts of electricity which may be applied before tracking takes place in the polymer sample. The maximum voltage that can be measured in a CTI test is 600 volts.

Surface Appearance: This was a visual observation test, with the notation "+" indicating higher ratings:

"++": No blemish, excellent color and cosmetic appearance.

"+": Slight or no blemish with good color and cosmetic appearance.

"−": Blemishes observed and acceptable or poor appearance.

Results are shown in Tables 2–4 below.

TABLE 2

| Example | LCP wt. % | PPO wt. % | TiO₂ wt. % | CaSO4 Wt. % | Tensile Strength | Elong. | Flx St | Flx. Mod. | DTUL | CTI Volts |
|---|---|---|---|---|---|---|---|---|---|---|
| Compare 1 | 100 | 0 | 0 | 0 | | | | | | 150 |
| Compare 2 | 10.27 | 89.73 | 0 | 0 | | | | | | 150 |
| 30-1 | 7.19 | 62.81 | 30 | 0 | 9891 | 4.54 | 15830 | 476100 | 184 | 325 |
| 30-2 | 7.19 | 62.81 | 22.5 | 7.5 | 9198 | 3.05 | 14860 | 525700 | 184 | 325 |
| 30-3 | 7.19 | 62.81 | 15 | 15 | 8556 | 7.24 | 15990 | 519800 | 186 | 300 |
| 30-4 | 7.19 | 62.81 | 7.5 | 22.5 | 8337 | 5.05 | 15570 | 552100 | 185 | 325 |
| 30-6 | 7.19 | 62.81 | 5 | 25 | 7518 | 8.54 | — | — | — | 300 |
| 30-7 | 7.19 | 62.81 | 0 | 30 | 7673 | 4.36 | 14510 | 596700 | 181 | 250 |
| 40-1 | 6.16 | 53.84 | 40 | 0 | 9246 | 2.16 | 14430 | 581200 | 185 | 275 |
| 40-2 | 6.16 | 53.84 | 30 | 10 | 9548 | 3.59 | 15440 | 605900 | 185 | 300 |
| 40-3 | 6.16 | 53.84 | 20 | 20 | 8587 | 4.08 | 16250 | 616700 | 186 | 350 |
| 40-4 | 6.16 | 53.84 | 10 | 30 | 8235 | 3.96 | 15690 | 600500 | 184 | 325 |
| 40-5 | 6.16 | 53.84 | 5 | 35 | 7157 | 4.67 | 14570 | 665400 | 185 | 375 |
| 40-6 | 6.16 | 53.84 | 2.5 | 37.5 | 6972 | 5.38 | 14460 | 662700 | 187 | 350 |
| 40-7 | 6.16 | 53.84 | 0 | 40 | 6723 | 5.13 | 13990 | 710800 | 187 | 275 |
| 50-1 | 5.1 | 44.9 | 50 | 0 | 7783 | 1.3 | — | — | — | 275 |

TABLE 2-continued

| Example | LCP wt. % | PPO wt. % | TiO$_2$ wt. % | CaSO4 Wt. % | Tensile Strength | Elong. | Flx St | Flx. Mod. | DTUL | CTI Volts |
|---|---|---|---|---|---|---|---|---|---|---|
| 50-6 | 5.1 | 44.9 | 12.5 | 37.5 | 7552 | 2.1 | — | — | — | 400 |
| 50-7 | 5.1 | 44.9 | 5 | 45 | 7171 | 3.04 | — | — | — | 425 |
| 50-8 | 5.1 | 44.9 | 0 | 50 | 6712 | 1.3 | — | — | — | 450 |

The test results in Table 3 shows that the addition of a small amount of brightening agent increases the track index performance and improves the comparative tracking index performance of Example 40-4, comprising 6.16 wt. % LCP, 53.84 wt. % PPO, 10 wt. % TiO2, and 30 wt. % CaSO4:

TABLE 3

| Wt. % Add'l Filler | CTI volts |
|---|---|
| NONE | 325 |
| 0.015 Carbon black | 325 |
| 0.015 Carbon black + 0.04 Uvitex | 375 |
| 0.02 Carbon black + 0.04 Uvitex | 375 |
| 0.02 Carbon black + 0.06 Uvitex | 375 |
| 5 BaSO4 | 275 |

The presence of TiO2 in the compound is observed to enhance the cosmetic appearance of the molded items made with these compounds. The material of Example 50-8 with no TiO2 has patches and blemishes on the surface while the materials from Examples 50-7 and 50-6 show superior cosmetic appearances as reported below:

TABLE 4

| Example | LCP wt. % | PPO wt. % | TiO2 wt. % | CaSO4 wt. % | Tensile Strength | Elong. | CTI Volts | Appearance |
|---|---|---|---|---|---|---|---|---|
| 50-6 | 5.1 | 44.9 | 12.5 | 37.5 | 7552 | 2.1 | 400 | ++ |
| 50-7 | 5.1 | 44.9 | 5 | 45 | 7171 | 3.04 | 425 | + |
| 50-8 | 5.1 | 44.9 | 0 | 50 | 6712 | 1.3 | 450 | − |

As is apparent from the foregoing description, the materials prepared and procedures followed relate only to preferred embodiments of our invention. While forms of the invention have been illustrated and described, modifications can be made without departing from the spirit and scope of the invention. Accordingly, it is not intended that our invention be limited thereby.

What is claimed is:

1. An electronic or electrical apparatus, comprising:

a component comprising:
  a polymer blend comprising:
    (a) about 50 to 95 weight percent, based on total weight of components (a) and (b), of poly(phenylene oxide);
    (b) about 5 to 50 weight percent, based on total weight of components (a) and (b), of thermotropic liquid crystalline polymer; and
    (c) non-conductive filler, in an amount sufficient to increase the comparative tracking index (CTI) rating of the polymer blend to above 220 volts.

2. A circuit breaker comprising:
a polymer blend comprising:
  (a) about 50 to 95 weight percent, based on total weight of components (a) and (b), of poly(phenylene oxide);
  (b) about 5 to 50 weight percent, based on total weight of components (a) and (b), of thermotropic liquid crystalline polymer; and
  (c) non-conductive filler, in an amount sufficient to increase the comparative tracking index (CTI) rating of the polymer blend to above 220 volts.

3. An electronic or electrical apparatus, comprising:
a component comprising:
  a polymer blend comprising:
    (a) about 50 to 95 weight percent, based on total weight of components (a) and (b), of poly (phenylene oxide);
    (b) about 5 to 50 weight percent, based on total weight of components (a) and (b), of thermotropic liquid crystalline polymer; and
    (c) non-conductive filler, in an amount sufficient to increase the comparative tracking index (CTI) rating of the polymer blend to above 220 volts,
  wherein said non-conductive filler is present in an amount of about 30 to 40 weight percent, based on the total weight of the polymer blend, said non-conductive filler comprises titanium dioxide and calcium sulfate, and said titanium dioxide is present in an amount of about 5 to 10 weight percent, based on the total weight of the polymer blend.

4. An electronic or electrical apparatus, comprising:
a component comprising:
  a polymer blend comprising:
    (a) about 50 to 95 weight percent, based on total weight of components (a) and (b), of poly (phenylene oxide);
    (b) about 5 to 50 weight percent, based on total weight of components (a) and (b), of thermotropic liquid crystalline polymer; and
    (c) non-conductive filler, in an amount sufficient to increase the comparative tracking index (CTI) rating of the polymer blend to above 220 volts,
  said polymer blend further comprising at least one fluorescent optical brightener in an amount of greater than 0.005 wt. % of the total weight of the polymer blend, said brightener having one or more moieties derived from substituted anchracene, stilbene, triazine, thiazole, benzoxazole, coumarin, xanthene, triazole, oxazole, thiophene or pyrazoline, and having a boiling point $T_{bp} > T_m - 60$ C, where $T_m$ is the melting point of the liquid crystalline polymer.

* * * * *